US011903099B2

(12) United States Patent
Rostami

(10) Patent No.: US 11,903,099 B2
(45) Date of Patent: Feb. 13, 2024

(54) VAPORIZER OF AN ELECTRONIC VAPING DEVICE AND METHOD OF FORMING A VAPORIZER

(71) Applicant: Altria Client Services LLC, Richmond, VA (US)

(72) Inventor: Ali A. Rostami, Richmond, VA (US)

(73) Assignee: Altria Client Services LLC, Richmond, VA (US)

(*) Notice: Subject to any disclaimer, the term of this patent is extended or adjusted under 35 U.S.C. 154(b) by 608 days.

(21) Appl. No.: 15/235,315

(22) Filed: Aug. 12, 2016

(65) Prior Publication Data

US 2018/0042301 A1 Feb. 15, 2018

(51) Int. Cl.

| | |
|---|---|
| ***H05B 3/16*** | (2006.01) |
| ***H05B 3/48*** | (2006.01) |
| ***H05B 3/34*** | (2006.01) |
| ***H05B 3/26*** | (2006.01) |
| ***A24F 40/46*** | (2020.01) |
| ***A24F 40/70*** | (2020.01) |
| ***H05B 3/18*** | (2006.01) |

(52) U.S. Cl.

CPC ............... *H05B 3/16* (2013.01); *A24F 40/46* (2020.01); *A24F 40/70* (2020.01); *H05B 3/18* (2013.01); *H05B 3/265* (2013.01); *H05B 3/34* (2013.01); *H05B 3/48* (2013.01); *H05B 2203/017* (2013.01); *H05B 2203/021* (2013.01)

(58) Field of Classification Search

CPC ............ A24F 47/008; H05B 2203/017; H05B 2203/021; H05B 3/16; H05B 3/18; H05B 3/265; H05B 3/34; H05B 3/48

USPC .......................................................... 392/395

See application file for complete search history.

(56) References Cited

U.S. PATENT DOCUMENTS

| | | | |
|---|---|---|---|
| 3,695,267 A | 10/1972 | Hirtz et al. | |
| 5,878,752 A | 3/1999 | Adams et al. | |
| 7,920,777 B2 | 4/2011 | Rabin et al. | |
| 8,165,460 B2 | 4/2012 | Hickey et al. | |
| 9,078,473 B2 | 7/2015 | Worm et al. | |
| 9,078,475 B2 | 7/2015 | Li et al. | |
| 9,339,062 B2 | 5/2016 | Hon | |
| 9,707,309 B2 * | 7/2017 | Torres | A61L 9/127 |
| 9,888,719 B2 * | 2/2018 | Cadieux | A61M 15/06 |
| 2012/0111347 A1 | 5/2012 | Hon | |
| 2013/0087160 A1 | 4/2013 | Gherghe | |

(Continued)

FOREIGN PATENT DOCUMENTS

| | | |
|---|---|---|
| CN | 104039184 A | 9/2014 |
| CN | 204796739 U | 11/2015 |

(Continued)

OTHER PUBLICATIONS

Beyhaghi, Wicking and evaporation of liquids in porous wicks: a simple analytical approach to optimization of wick design. Jan. 6, 2014, ALChE, vol. 60, Issue 5, 1935. (Year: 2016).*

(Continued)

*Primary Examiner* — Nathaniel E Wiehe
*Assistant Examiner* — Spencer H. Kirkwood

(57) ABSTRACT

A method of forming a vaporizer of an electronic vaping device includes applying a porous material to at least one surface of a heating element to form a coating thereon. The heating element is formed of a conductive material.

5 Claims, 8 Drawing Sheets

(56) References Cited

U.S. PATENT DOCUMENTS

| | | | | |
|---|---|---|---|---|
| 2013/0213419 | A1* | 8/2013 | Tucker | H05B 3/12 131/328 |
| 2013/0255702 | A1* | 10/2013 | Griffith, Jr. | A24F 40/70 131/328 |
| 2013/0340750 | A1* | 12/2013 | Thorens | A24F 47/008 128/202.21 |
| 2014/0014126 | A1 | 1/2014 | Peleg et al. | |
| 2014/0283860 | A1 | 9/2014 | Stolz et al. | |
| 2014/0346689 | A1* | 11/2014 | Dubief | A24F 40/44 261/142 |
| 2015/0068541 | A1 | 3/2015 | Sears et al. | |
| 2015/0164143 | A1 | 6/2015 | Maas | |
| 2015/0201674 | A1 | 7/2015 | Dooly et al. | |
| 2015/0272216 | A1 | 10/2015 | Dai et al. | |
| 2016/0135507 | A1 | 5/2016 | Thorens et al. | |
| 2016/0309785 | A1 | 10/2016 | Holtz | |
| 2016/0309786 | A1 | 10/2016 | Holtz et al. | |
| 2017/0325502 | A1 | 11/2017 | Nelson et al. | |

FOREIGN PATENT DOCUMENTS

| | | | | |
|---|---|---|---|---|
| CN | 105310114 | A | 2/2016 | |
| JP | 2012/517229 | A | 8/2012 | |
| JP | 2015/500025 | A | 1/2015 | |
| RU | 2609395 | C2 | 2/2017 | |
| RU | 2613785 | C2 | 3/2017 | |
| WO | WO-9409842 | A1 | 5/1994 | |
| WO | WO-2013/0083634 | A1 | 6/2013 | |
| WO | WO-2015071682 | A1 | 5/2015 | |
| WO | WO-2015107552 | A1 | 7/2015 | |
| WO | WO-2016001921 | A2 * | 1/2016 | A24F 40/42 |
| WO | 2016108694 | A1 | 7/2016 | |
| WO | WO-2016/118005 | A1 | 7/2016 | |
| WO | WO-2016108694 | A1 * | 7/2016 | A24F 40/46 |

OTHER PUBLICATIONS

International Search Reporting and Written Opinion for corresponding International Application No. PCT/EP2017/070108 dated Nov. 7, 2017.

International Preliminary Report on Patentability for International Application No. PCT/EP2017/070108 dated Feb. 12, 2019.

Russian Office Action and Search Report dated Sep. 29, 2020 for corresponding Russian Application No. 2019106289, and English-language translation thereof.

European Office Action dated Dec. 2, 2020 for corresponding European Application No. 17749473.9.

Chinese Office Action dated Jan. 4, 2021 for corresponding Chinese Application No. 201780044562.8, and English-language translation thereof.

Russian Notice of Allowance dated Jan. 26, 2021 for corresponding Russian Application No. 2019106289, and English-language translation thereof.

Chinese Office Action dated Sep. 24, 2021 for corresponding Chinese Application No. 201780044562.8, and English-language translation thereof.

Japanese Office Action dated Aug. 30, 2021 for corresponding Japanese Application No. 2019-507085, and English-language translation thereof.

Japanese Office Action dated Apr. 13, 2022 for corresponding Japanese Patent Application No. 2019-507085 and English language translation thereof.

Chinese Office Action dated Apr. 4, 2022 for corresponding Chinese Application No. 201780044562.8, and English-language translation thereof.

Korean Office Action dated Aug. 18, 2022 for corresponding Korean Patent Application No. 10-2019-7003073 and English language translation thereof.

Decision to Grant dated Nov. 9, 2022 in corresponding Japanese Application No. 2019- 507085. Translation provided.

Chinese Office Action dated Nov. 28, 2022 issued in corresponding Chinese Patent Application No. 201780044562.8.

Surface Coating Technology, pp. 40-43, Chen Xueding et al., Mechanical Industry, Press, May 1994.

Chinese Board Decision regarding Application No. 201780044562.8 dated Jan. 13, 2023. Translation not provided.

Korean Notice of Allowance dated Feb. 24, 2023 corresponding to South Korean Application No. 2019-7003073. English translation provided.

* cited by examiner

VAPORIZER OF AN ELECTRONIC VAPING DEVICE AND METHOD OF FORMING A VAPORIZER

BACKGROUND

Field

The present disclosure relates to an electronic vaping or e-vaping device.

Description of Related Art

An e-vaping device includes a heater element which vaporizes a pre-vapor formulation to produce a "vapor."

The e-vaping device includes a power supply, such as a rechargeable battery, arranged in the device. The battery is electrically connected to the heater, such that the heater heats to a temperature sufficient to convert a pre-vapor formulation to a vapor. The vapor exits the e-vaping device through a mouthpiece including at least one outlet.

SUMMARY

At least one example embodiment relates to a method of forming a vaporizer of an electronic vaping device.

In at least one example embodiment, a method of forming a vaporizer of an electronic vaping device includes applying a porous material to at least one surface of a heating element to form a coating thereon, the heating element formed of a conductive material.

In at least one example embodiment, the porous material has a porosity ranging from about 50% to about 80%. The porous material is flexible when dry. The porous material is a hydrophilic material. The porous material includes at least one of ceramic and cellulose.

In at least one example embodiment, the coating has a thickness ranging from about 0.5 mm to about 1.0 mm.

In at least one example embodiment, the applying step includes dipping the heating element in a slurry including the porous material. In at least one example embodiment, the method includes drying the heating element at a temperature of about 100° F. to about 500° F. The slurry comprises about 50% to about 99% of the porous material.

In at least one example embodiment, the applying step includes spraying the heating element with a composition including the porous material. The method may include drying the heating element.

In at least one example embodiment, the applying step includes adhering the porous material to at least one surface of the heating element.

In at least one example embodiment, the method includes shaping the heating element before the applying step.

In at least one example embodiment, the method includes shaping the heating element after the applying step.

At least one example embodiment relates to a cartridge of an electronic vaping device.

In at least one example embodiment, a cartridge of an electronic vaping device includes a housing extending in a longitudinal direction, a reservoir in the housing, the reservoir configured to store a pre-vapor formulation, a vaporizer in the housing, and an absorbent material between the reservoir and vaporizer. The vaporizer includes a heating element formed of a conductive material and a coating of a porous material on at least one surface of the heater heating element. The absorbent material is configured to convey the pre-vapor formulation from the reservoir to the coating of the vaporizer.

In at least on example embodiment, the porous material has a porosity ranging from about 50% to about 80%. The porous material is flexible when dry. The porous material is a hydrophilic material and includes at least one of ceramic and cellulose.

In at least on example embodiment, the heating element is in the form of one or more of a coil, a wire, a plate, a stamped plate, a spiral, a tube, a curled heater, a bar, and a disc.

In at least one example embodiment, the coating has a thickness ranging from about 0.5 mm to about 1.0 mm.

At least one example embodiment relates to an electronic vaping device.

In at least one example embodiment, an electronic vaping device includes a housing extending in a longitudinal direction, a reservoir in the housing, the reservoir configured to store a pre-vapor formulation, a vaporizer in the housing, an absorbent material between the reservoir and the vaporizer, and a power supply in the housing, the power supply electrically connectable to the heating element. The vaporizer includes a heating element formed of a conductive material and a coating of a porous material on at least one surface of the heating element. The absorbent material is configured to convey the pre-vapor formulation from the reservoir to the coating of the vaporizer.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
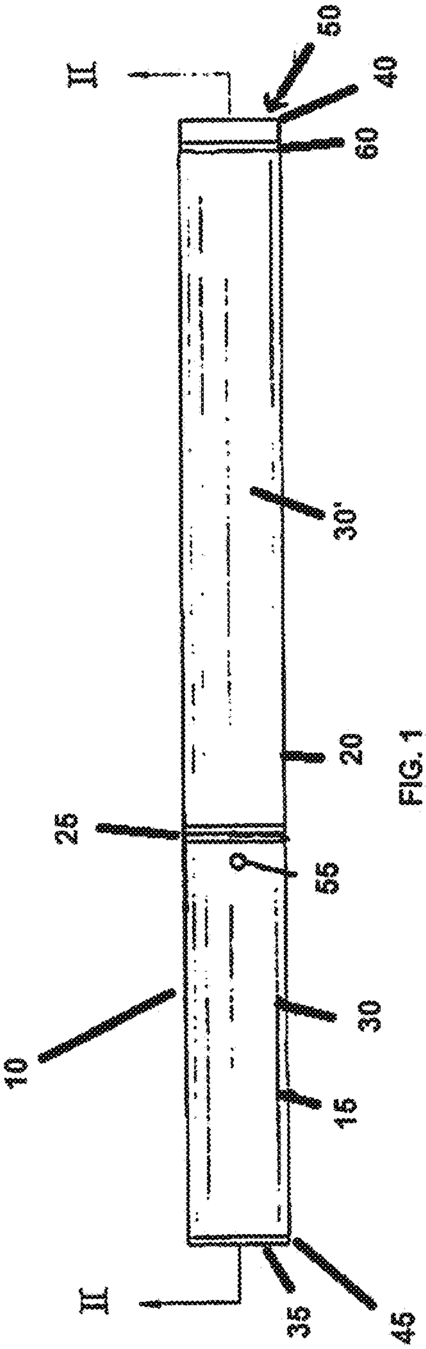
FIG. 1 is a side view of an e-vaping device according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/of" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a side view of an e-vaping device according to at least one example embodiment.

In at least one example embodiment, as shown in FIG. 1, an electronic vaping device (e-vaping device) 10 may include a replaceable cartridge (or first section) 15 and a reusable battery section (or second section) 20, which may be coupled together at a threaded connector 25. It should be appreciated that the connector 25 may be any type of connector, such as a snug-fit, detent, clamp, bayonet, and/or clasp. An air inlet 55 extends through a portion of the connector 25.

In at least one example embodiment, the connector 25 may be the connector described in U.S. application Ser. No. 15/154,439, filed May 13, 2016, the entire contents of which is incorporated herein by reference thereto. As described in U.S. application Ser. No. 15/154,439, the connector 25 may be formed by a deep drawn process.

In at least one example embodiment, the first section 15 may include a first housing 30 and the second section 20 may include a second housing 30'. The e-vaping device 10 includes a mouth-end insert 35 at a first end.

In at least one example embodiment, the first housing 30 and the second housing 30' may have a generally cylindrical cross-section. In other example embodiments, the housings 30 and 30' may have a generally triangular cross-section along one or more of the first section 15 and the second section 20. Furthermore, the housings 30 and 30' may have the same or different cross-section shape, or the same or different size. As discussed herein, the housings 30, 30' may also be referred to as outer or main housings.

In at least one example embodiment, the e-vaping device 10 may include an end cap 40 at a second end 50 of the e-vaping device 10. The e-vaping device 10 also includes a light 60 between the end cap 40 and the first end 45 of the e-vaping device 10.

Figure 2:
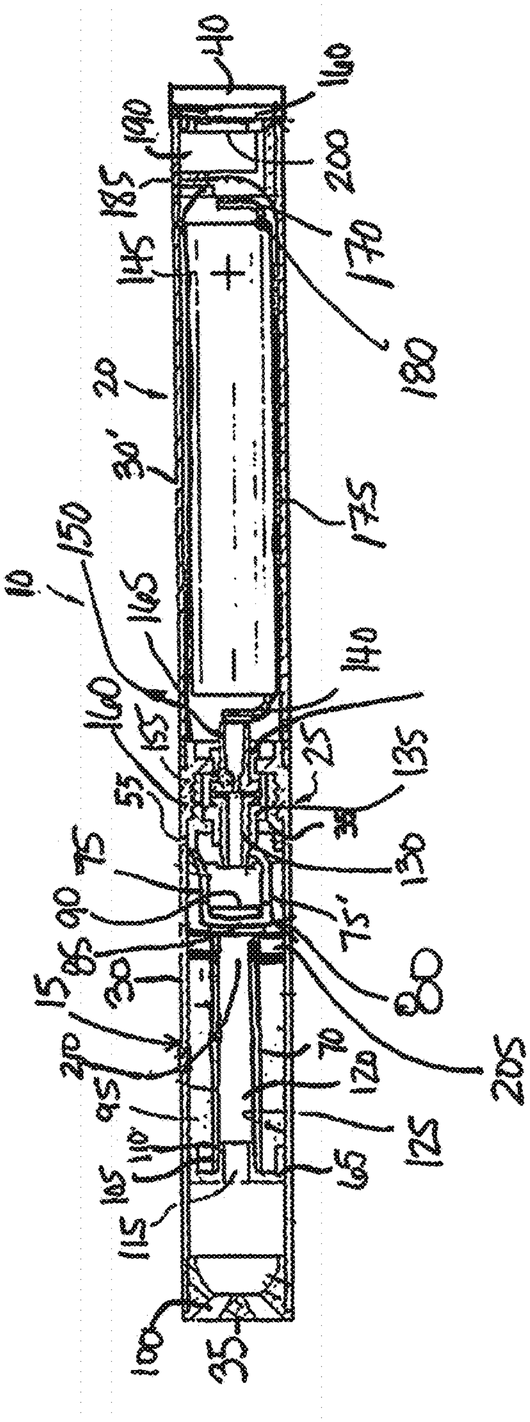
FIG. 2 is a cross-sectional view along line II-II of the e-vaping device of FIG. 1 according to at least one example embodiment.

FIG. 2 is a cross-sectional view along line II-II of the e-vaping device of FIG. 1.

In at least one example embodiment, as shown in FIG. 2, the first section 15 may include a reservoir 95 configured to store a pre-vapor formulation and a vaporizer 80 that may vaporize the pre-vapor formulation. The vaporizer 80 incudes a heating element 85 and at least one coating of a porous material 90 on at least one surface of the heating element 85. The porous material 90 may draw the pre-vapor formulation from the reservoir 95. The e-vaping device 10 may include the features set forth in U.S. Patent Application Publication No. 2013/0192623 to Tucker et al. filed Jan. 31, 2013 and/or features set forth in U.S. patent application Ser. No. 15/135,930 to Holtz et al. filed Apr. 22, 2016, the entire contents of each of which are incorporated herein by reference thereto. In other example embodiments, the e-vaping device may include the features set forth in U.S. patent application Ser. No. 15/135,923 filed Apr. 22, 2016, and/or U.S. Pat. No. 9,289,014 issued Mar. 22, 2016, the entire contents of each of which is incorporated herein by this reference thereto.

In at least one example embodiment, the pre-vapor formulation is a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or vapor formers such as glycerin and propylene glycol.

In at least one example embodiment, the first section 15 may include the housing 30 extending in a longitudinal direction and an inner tube (or chimney) 70 coaxially positioned within the housing 30.

In at least one example embodiment, a first connector piece 155 may include a male threaded section for effecting the connection between the first section 15 and the second section 20.

In at least one example embodiment, at least two air inlets 55 may be included in the housing 30. Alternatively, a single air inlet 55 may be included in the housing 30. Such arrangement allows for placement of the air inlet 55 close to the connector 25 without occlusion by the presence of the first connector piece 155. This arrangement may also reinforce the area of air inlets 55 to facilitate precise drilling of the air inlets 55.

In at least one example embodiments, the air inlets 55 may be provided in the connector 25 instead of in the housing 30. In other example embodiments, the connector 25 may not include threaded portions.

In at least one example embodiment, the at least one air inlet 55 may be formed in the housing 30, adjacent the connector 25 to minimize the chance of an adult vaper's fingers occluding one of the ports and to control the resistance-to-draw (RTD) during vaping. In at least one example embodiment, the air inlet 55 may be machined into the housing 30 with precision tooling such that their diameters are closely controlled and replicated from one e-vaping device 010 to the next during manufacture.

In at least one example embodiment, the air inlets 55 may be sized and configured such that the e-vaping device 10 has a resistance-to-draw (RTD) in the range of from about 60 mm $H_2O$ to about 150 mm $H_2O$.

In at least one example embodiment, a nose portion 110 of a gasket 65 may be fitted into a first end portion 105 of the inner tube 70. An outer perimeter of the gasket 65 may provide a substantially tight seal with an interior surface 125 of the housing 30. The gasket 65 may include a central channel 115 disposed between the inner passage 120 of the inner tube 70 and the interior of the mouth-end insert 35, which may transport the vapor from the inner passage 120 to the mouth-end insert 35. The mouth-end insert 35 includes at least two outlets 100, which may be located off-axis from the longitudinal axis of the e-vaping device 10. The outlets 100 may be angled outwardly in relation to the longitudinal axis of the e-vaping device 10. The outlets 100 may be substantially uniformly distributed about the perimeter of the mouth-end insert 35 so as to substantially uniformly distribute vapor.

An absorbent material 205 surrounds a second end of the inner tube 70. The absorbent material 205 is in the form of a disc having a central channel 210 therethrough. The central channel 210 is in communication with the inner passage 120 of the inner tube 70. The absorbent material 205 is sized and configured to fit snugly between the inner tube and the inner surface 125 of the housing 30.

In at least one example embodiment, the space defined between the gasket 65, the absorbent material 205, the housing 30, and the inner tube 70 may establish the confines of the reservoir 95. The reservoir 95 may contain a pre-vapor formulation, and optionally a storage medium (not shown) configured to store the pre-vapor formulation therein. The storage medium may include a winding of cotton gauze or other fibrous material about the inner tube 70.

In at least one example embodiment, the reservoir 95 may at least partially surround the inner passage 120.

In at least one example embodiment, the reservoir 95 may be sized and configured to hold enough pre-vapor formulation such that the e-vaping device 10 may be configured for vaping for at least about 200 seconds. Moreover, the e-vaping device 10 may be configured to allow each puff to last a maximum of about 5 seconds.

In at least one example embodiment, the storage medium may be a fibrous material including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be a sintered, porous or foamed material. Also, the fibers may be sized to be irrespirable and may have a cross-section which has a Y-shape, cross shape, clover shape or any other suitable shape. In at least one example embodiment, the reservoir 95 may include a filled tank lacking any storage medium and containing only pre-vapor formulation.

During vaping, pre-vapor formulation may be transferred from the reservoir 95 and/or storage medium to the proximity of the heating element 85 via capillary action of the absorbent material 205 and the porous material 90 coated on the heating element 85.

In at least one example embodiment, the absorbent material 205 and the porous material 90 may include any suitable material or combination of materials. Examples of suitable materials may be, but not limited to, paper-, cellulosic-, glass-, ceramic- or graphite-based materials. The absorbent material 205 and/or the porous material 90 may have any suitable capillarity drawing action to accommodate pre-vapor formulations having different physical properties such as density, viscosity, surface tension and vapor pressure. The glass-based materials may be in the form of fibers and/or beads. The absorbent material 205 and/or the porous material 90 may be non-conductive.

In at least one example embodiment, the porous material 90 may include aluminum oxide, zirconium oxide, silicon dioxide, quartz, and combinations thereof.

In at least one example embodiment, the absorbent material 205 and/or the porous material 90 is chosen so that the porous material 90 does not loose structural integrity when saturated with the pre-vapor formulation. The absorbent material 205 and/or the porous material 90 may be hydrophilic.

In at least one example embodiment, the porous material 90 has a porosity of at least about 50% (e.g., at least about 60%, at least about 70%, at least about 80%, at least about 90%, or at least about 95%). Lower porosity requires more solid mass on the wire that increases the thermal latency and energy efficiency. The porous material 90 is substantially heat-resistant up to about 500° C. (e.g., up to about 450° C., up to about 400° C., up to about 350° C., or up to about 300° C.).

In at least one example embodiment, the porous material 90 is coated onto the heating element 85 by spraying, dipping, and/or adhering the porous material 90 to at least one surface of the heating element 85 as further discussed below. The coating of the porous material 90 may have a thickness of about 0.5 mm to about 1.0 mm (e.g., about 0.6 mm to about 0.9 mm or about 0.7 mm to about 0.8 mm). The thickness of the coating of the porous material 90 may be chosen to hold a sufficient amount of the pre-vapor formulation to form a desired amount of vapor per puff. The vaporizer 80 may include two or more different coatings. The coatings may each include the same or different porous materials and/or may have the same and/or different thicknesses, densities, and/or porosities.

In at least one example embodiment, the porous material 90 remains flexible after the porous material 90 is dried on the heating element 85 to form the vaporizer 80.

For example, the vaporizer 80 may include the heating element 85 and a layer of paper coated on the heating element 85 with an adhesive.

In at least one example embodiment, the heating element 85 of the vaporizer 80 may include a wire, a wire coil, a spiral, a plate, a disc, a mesh, and/or any other suitable form. The wire may be a metal wire. At least one surface of the heating element 85 is coated with the porous material 90. The porous material 90 is at least partially in direct physical contact with the absorbent material 205.

In at least one example embodiment, the heating element 85 may be formed of any suitable electrically resistive materials. Examples of suitable electrically resistive materials may include, but not limited to, copper, titanium, zirconium, tantalum and metals from the platinum group. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heating element 85 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heating element 85 may include at least one material selected from the group consisting of stainless steel, copper, copper alloys, nickel-chromium alloys, super alloys and combinations thereof. In an example embodiment, the heating element 85 may be formed of nickel-chromium alloys or iron-chromium alloys.

In at least one example embodiment, a first lead 75 is physically and electrically connected to the male threaded connector piece 155. As shown, the male threaded first connector piece 155 is a hollow cylinder with male threads on a portion of the outer lateral surface. The connector piece is conductive, and may be formed or coated with a conductive material. A second lead 75' is physically and electrically connected to a first conductive post 130. The first conductive post 130 may be formed of a conductive material (e.g., stainless steel, copper, etc.), and may have a T-shaped cross-section as shown in FIG. 2. The first conductive post 130 nests within the hollow portion of the first connector piece 155, and is electrically insulated from the first connecter piece 155 by an insulating shell 135. The first conductive post 130 may be hollow as shown, and the hollow portion may be in fluid communication with the air passage 120. Accordingly, the first connector piece 155 and the first conductive post 130 form respective external electrical connection to the heating element 85.

In at least one example embodiment, the heating element 85 may heat pre-vapor formulation in the porous material 90 by thermal conduction.

As shown in FIG. 2, the second section 20 includes a power supply 145, a control circuit 185, and a sensor 190. As shown, the control circuit 185 and the sensor 190 are disposed in the housing 30'. A female threaded second connector piece 160 forms a second end. As shown, the second connector piece 160 has a hollow cylinder shape with threading on an inner lateral surface. The inner diameter of the second connector piece 160 matches that of the outer diameter of the first connector piece 155 such that the two connector pieces 155, 160 may be threaded together to form the connection 25. Furthermore, the second connector piece 160, or at least the other lateral surface is conductive, for example, formed of or including a conductive material. As such, an electrical and physical connection occurs between the first and second connector pieces 155, 160 when connected.

As shown, a first lead 165 electrically connects the second connector piece 160 to the control circuit 185. A second lead 170 electrically connects the control circuit 185 to a first terminal 180 of the power supply 145. A third lead 175 electrically connects a second terminal 140 of the power supply 145 to the power terminal of the control circuit 185 to provide power to the control circuit 185. The second terminal 140 of the power supply 145 is also physically and electrically connected to a second conductive post 150. The second conductive post 150 may be formed of a conductive material (e.g., stainless steel, copper, etc.), and may have a T-shaped cross-section as shown in FIG. 2. The second conductive post 150 nests within the hollow portion of the second connector piece 160, and is electrically insulated from the second connector piece 160 by a second insulating shell 215. The second conductive post 150 may also be hollow as shown. When the first and second connector pieces 155, 160 are mated, the second conductive post 150 physically and electrically connects to the first conductive post 130. Also, the hollow portion of the second conductive post 150 may be in fluid communication with the hollow portion of the first conductive post 130.

While the first section 15 has been shown and described as having the male connector piece and the second section 20 has been shown and described as having the female connector piece, an alternative embodiment includes the opposite where the first section 15 has the female connector piece and the second section 20 has the male connector piece.

In at least one example embodiment, the power supply 145 includes a battery arranged in the e-vaping device 10. The power supply 145 may be a Lithium-ion battery or one of its variants, for example a Lithium-ion polymer battery. Alternatively, the power supply 145 may be a nickel-metal hydride battery, a nickel cadmium battery, a lithium-manganese battery, a lithium-cobalt battery or a fuel cell. The e-vaping device 10 may be vapable by an adult vapor until the energy in the power supply 145 is depleted or in the case of lithium polymer battery, a minimum voltage cut-off level is achieved.

In at least one example embodiment, the power supply 145 is rechargeable. The second section 20 may include circuitry configured to allow the battery to be chargeable by an external charging device. To recharge the e-vaping device 10, an USB charger or other suitable charger assembly may be used as described below.

In at least one example embodiment, the sensor 190 is configured to generate an output indicative of a magnitude and direction of airflow in the e-vaping device 10. The control circuit 185 receives the output of the sensor 190, and determines if (1) the direction of the airflow indicates a draw on the mouth-end insert 8 (versus blowing) and (2) the magnitude of the draw exceeds a threshold level. If these vaping conditions are met, the control circuit 185 electrically connects the power supply 145 to the heating element 85; thus, activating the heating element 85. Namely, the control circuit 185 electrically connects the first and second leads 165, 170 (e.g., by activating a heater power control transistor forming part of the control circuit 185) such that the heating element 85 becomes electrically connected to the power supply 145. In an alternative embodiment, the sensor 190 may indicate a pressure drop, and the control circuit 185 activates the heating element 85 in response thereto.

In at least one example embodiment, the control circuit 185 may also include a light 60, which the control circuit 185 activates to glow when the heating element 85 is activated and/or the battery 145 is recharged. The light 60 may include one or more light-emitting diodes (LEDs). The LEDs may include one or more colors (e.g., white, yellow, red, green, blue, etc.). Moreover, the light 60 may be arranged to be visible to an adult vaper during vaping, and may be positioned between the first end 45 and the second end 50 of the e-vaping device 10. In addition, the light 60 may be utilized for e-vaping system diagnostics or to indicate that recharging is in progress. The light 60 may also be configured such that the adult vaper may activate and/or deactivate the heater activation light 60 for privacy.

In at least one example embodiment, the control circuit 185 may include a time-period limiter. In another example embodiment, the control circuit 185 may include a manually operable switch for an adult vaper to initiate heating. The time-period of the electric current supply to the heating element 85 may be set or pre-set depending on the amount of pre-vapor formulation desired to be vaporized.

Next, operation of the e-vaping device to create a vapor will be described. For example, air is drawn primarily into the first section 15 through the at least one air inlet 55 in response to a draw on the mouth-end insert 35. The air passes through the air inlet 55, into the central channel 210 of the absorbent material 205, into the inner passage 120, and through the outlet 100 of the mouth-end insert 35. If the control circuit 185 detects the vaping conditions discussed above, the control circuit 185 initiates power supply to the heating element 85, such that the heating element 85 heats pre-vapor formulation in the porous material 90. The vapor and air flowing through the inner passage 120 combine and exit the e-vaping device 10 via the outlet 100 of the mouth-end insert 35.

When activated, the heating element 85 may heat a portion of the porous material 90 for less than about 10 seconds.

In at least one example embodiment, the first section 15 may be replaceable. In other words, once the pre-vapor formulation of the cartridge is depleted, only the first section 15 may be replaced. An alternate arrangement may include an example embodiment where the entire e-vaping device 10 may be disposed once the reservoir 95 is depleted. In at least one example embodiment, the e-vaping device 10 may be a one-piece e-vaping device.

In at least one example embodiment, the e-vaping device 10 may be about 80 mm to about 110 mm long and about 7 mm to about 8 mm in diameter. For example, in one example embodiment, the e-vaping device 10 may be about 84 mm long and may have a diameter of about 7.8 mm.

In at least one example embodiment, as shown in FIG. 2, the e-vaping device 10 the control circuit 200 is disposed on a rigid printed circuit board 410.

Figure 3:
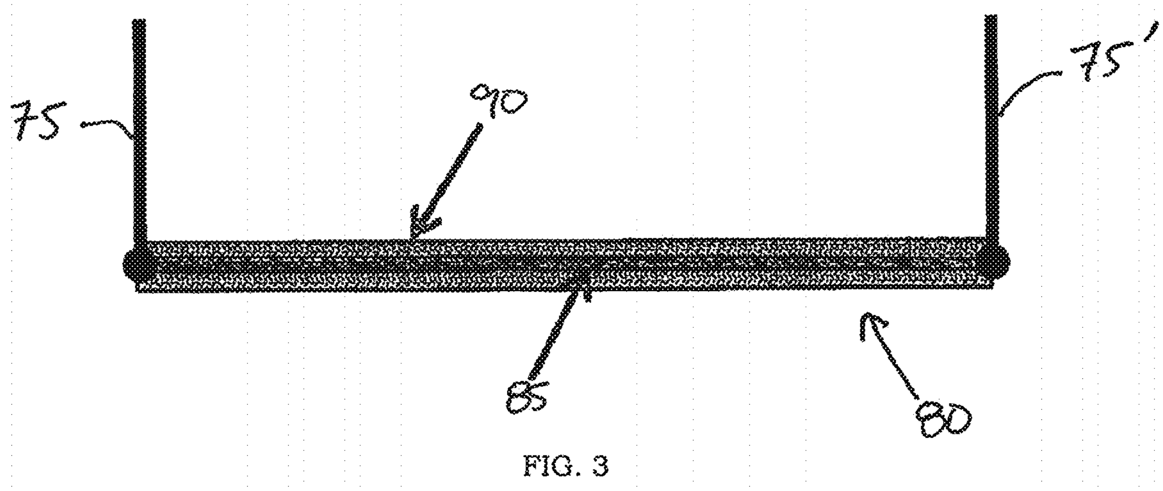
FIG. 3 is an enlarged cross-sectional view of a vaporizer of the e-vaping device of FIG. 2 according to at least one example embodiment.

FIG. 3 is an enlarged cross-sectional view of a vaporizer of the e-vaping device of FIG. 2 according to at least one example embodiment.

In at least one example embodiment, as shown in FIG. 3, the vaporizer 80 includes the heating element 85 and the porous material 90. As shown, the heating element 85 is in the form of a substantially straight wire formed of an electrically conductive material. The porous material 90 is coated on all sides of the heating element 85. The electrical leads 75, 75' are connected to the heating element 85 at ends of the wire. The leads 75, 75' may be connected to the ends of the wire by crimping and/or spot welding.

Figure 4:
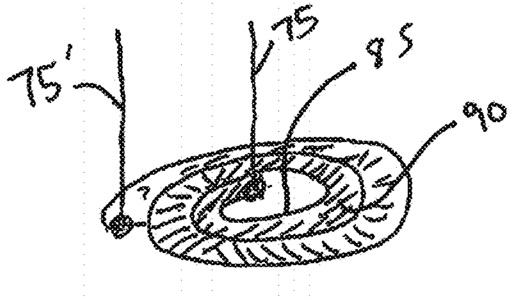
FIG. 4 is an illustration of a vaporizer according to at least one example embodiment.

FIG. 4 is an illustration of a vaporizer according to at least one example embodiment.

In at least one example embodiment, as shown in FIG. 4, the vaporizer 80 includes the heating element 85 and the porous material 90 as in FIGS. 2-3. As shown in FIG. 4, the heating element 85 is in the form of a spiral, formed of an electrically conductive wire. The porous material 90 is coated on sides of the wire between adjacent windings of the spiral. The electrical leads 75, 75' are connected to the heating element 85 at ends of the wire.

Figure 5:
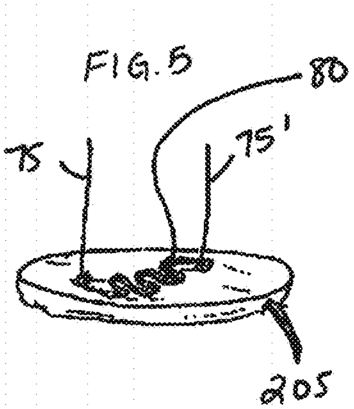
FIG. 5 is an illustration of a vaporizer and an absorbent material according to at least one example embodiment.

FIG. 5 is an illustration of a vaporizer and an absorbent material according to at least one example embodiment.

In at least one example embodiment, as shown in FIG. 5, the vaporizer 80 includes the heating element and the porous material as in FIGS. 2-4. As shown in FIG. 5, the vaporizer has a generally sinuous shape. As shown, a side portion of the vaporizer 80 directly contacts the absorbent material 205. The porous material 90 of the vaporizer 80 conveys the pre-vapor formulation in the absorbent material 205 to the heating element 85.

Figure 6:
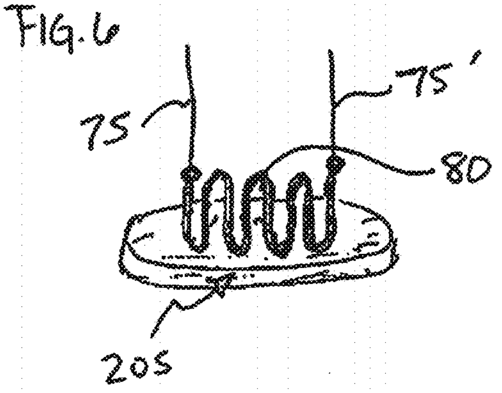
FIG. 6 is an illustration of a vaporizer and an absorbent material according to at least one example embodiment.

FIG. 6 is an illustration of a vaporizer and an absorbent material according to at least one example embodiment.

In at least one example embodiment, as shown in FIG. 6, the vaporizer 80 includes the heating element 85 and the porous material 90 as in FIGS. 2-5. As shown in FIG. 6, the vaporizer 80 has a generally sinuous shape. As shown, an end portion of the vaporizer 80 directly contacts the absorbent material 205.

Figure 7:
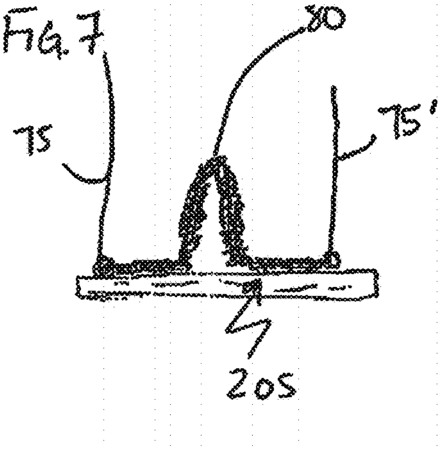
FIG. 7 is an illustration of a vaporizer and an absorbent material according to at least one example embodiment.

FIG. 7 is an illustration of a vaporizer and an absorbent material according to at least one example embodiment.

In at least one example embodiment, as shown in FIG. 7, the vaporizer 80 includes the heating element and the porous material as in FIGS. 2-5. As shown in FIG. 6, the vaporizer 80 has a bell shape, and end portions of the vaporizer 80 directly contact the absorbent material 205.

Figure 8:
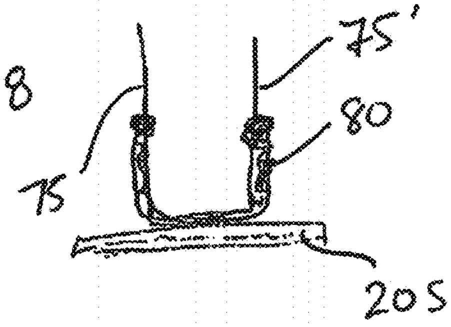
FIG. 8 is an illustration of a vaporizer and an absorbent material according to at least on example embodiment.

FIG. 8 is an illustration of a vaporizer and an absorbent material according to at least one example embodiment.

In at least one example embodiment, as shown in FIG. 8, the vaporizer 80 includes the heating element and the porous material as in FIGS. 2-5. As shown in FIG. 8, the vaporizer 80 is U-shaped, and a central portion of the vaporizer 80 directly contacts the absorbent material 205.

Figure 9:
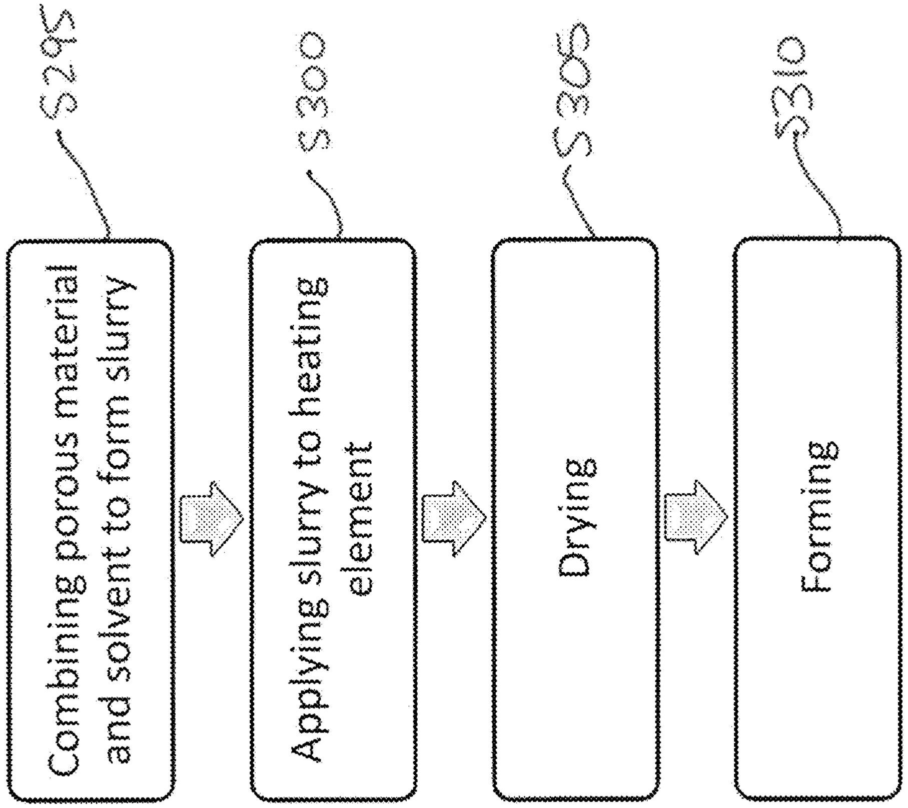
FIG. 9 is a diagram of a method of forming a vaporizer according to at least one example embodiment.

FIG. 9 is a diagram of a method of forming a vaporizer according to at least one example embodiment.

In at least on example embodiment, a method of making the vaporizer of FIGS. 1-8 includes combining S295 the porous material 90 and at least one solvent to form a slurry. The method also includes applying S300 the slurry to the heating element 85 to form the vaporizer 80 and drying S305 the vaporizer 80. Once the vaporizer 80 is dried, the method may also include forming S310 the vaporizer 80 into a desired shape and/or configuration.

In at least one example embodiment, the slurry includes about 50% to about 99% (e.g., about 55% to about 95%, about 60% to about 90%, about 65% to about 85%, or about 70% to about 80%) of the porous material 90 and about 1% to about 50% of the solvent (e.g. about 2% to about 45%, about 5% to about 40%, about 10% to about 35%, about 15% to about 30% or about 20% to about 25%).

In at least one example embodiment, as set forth above, the porous material 90 includes any suitable material or combination of materials. Examples of suitable materials may be, but not limited to, paper-, cellulosic-, glass-, ceramic- or graphite-based materials. The porous material 90 may have any suitable capillarity drawing action to accommodate pre-vapor formulations having different physical properties such as density, viscosity, surface tension and vapor pressure. The glass-based materials may be in the form of fibers and/or beads. For example, the porous material 90 may include aluminum oxide, zirconium oxide, silicon dioxide, quartz, and combinations thereof. The porous material 90 is substantially heat resistant.

In at least one example embodiment, the solvent may include at least one of water, ethanol, and combinations thereof. In at least one example embodiment, the slurry may further include one or more of a dispersant and a binder, such as a polymeric binder.

In at least one example embodiment, the drying S305 step may include drying the vaporizer 80 at ambient temperature for about 1 hour to about 36 hours (e.g., about 12 hours to about 24 hours or about 15 hours to about 20 hours). In at least one example embodiment, the drying S305 step may include heating the vaporizer 80 at a temperature of at least about 100° F. (e.g., at least about 150° F. or about least about 200° F.) for about 10 minutes to about 36 hours (e.g., about 12 hours to about 24 hours or about 15 hours to about 20 hours). During the drying S305 step, the solvent is evaporated leaving the coating of the porous material 90 on the heating element 85.

For example, the combining S295 step may include combining a cellulosic based material with water and applying S300 the cellulosic material to the heating element 85 to form the vaporizer 80. The vaporizer 80 including a coating of cellulosic material may be used in e-vaping devices 10 in which the heating temperature is controlled so as to be less than about 400° C.

In at least one example embodiment, once the coating is formed, the porous material 90 remains flexible so that the vaporizer 80 may be formed into a desired shaped and configuration.

Figure 10:
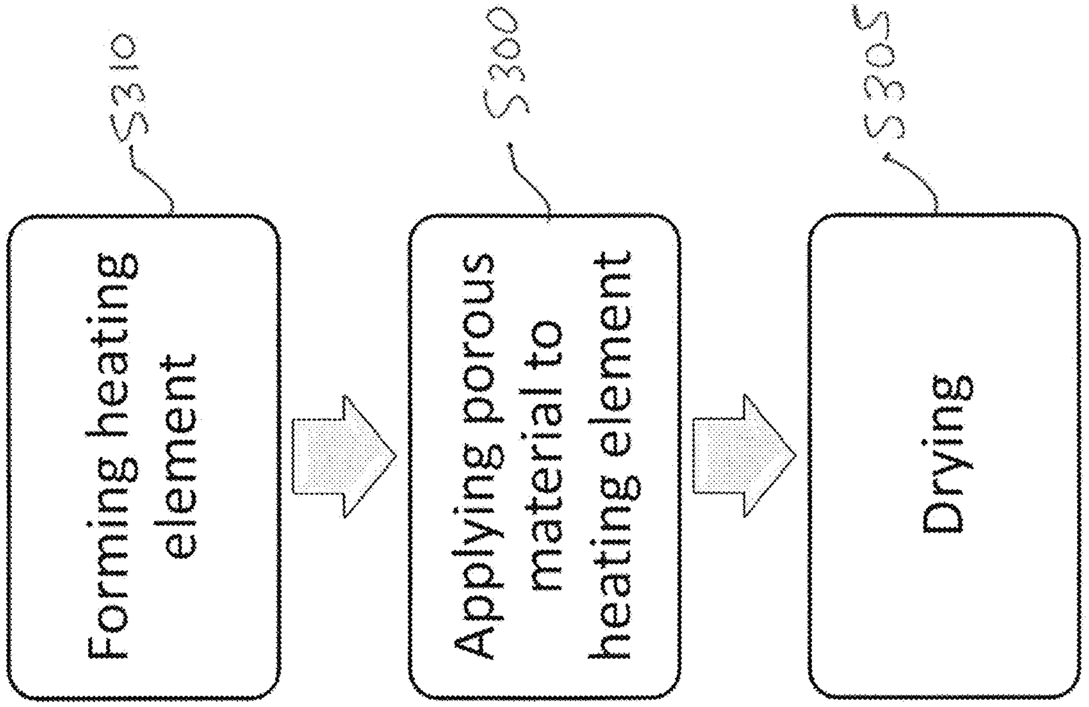
FIG. 10 is a diagram of a method of forming a vaporizer according to at least one example embodiment.

FIG. 10 is a diagram of a method of forming a vaporizer according to at least one example embodiment.

In at least one example embodiment, the method is the same as in FIG. 9 except that the forming S310 step occurs before the porous material 90 is applied S300 to the heating element 85. In this method, the heating element 85 may be bent, curled, rolled, stamped, or otherwise shaped before the porous material 90 is applied.

Figure 11:
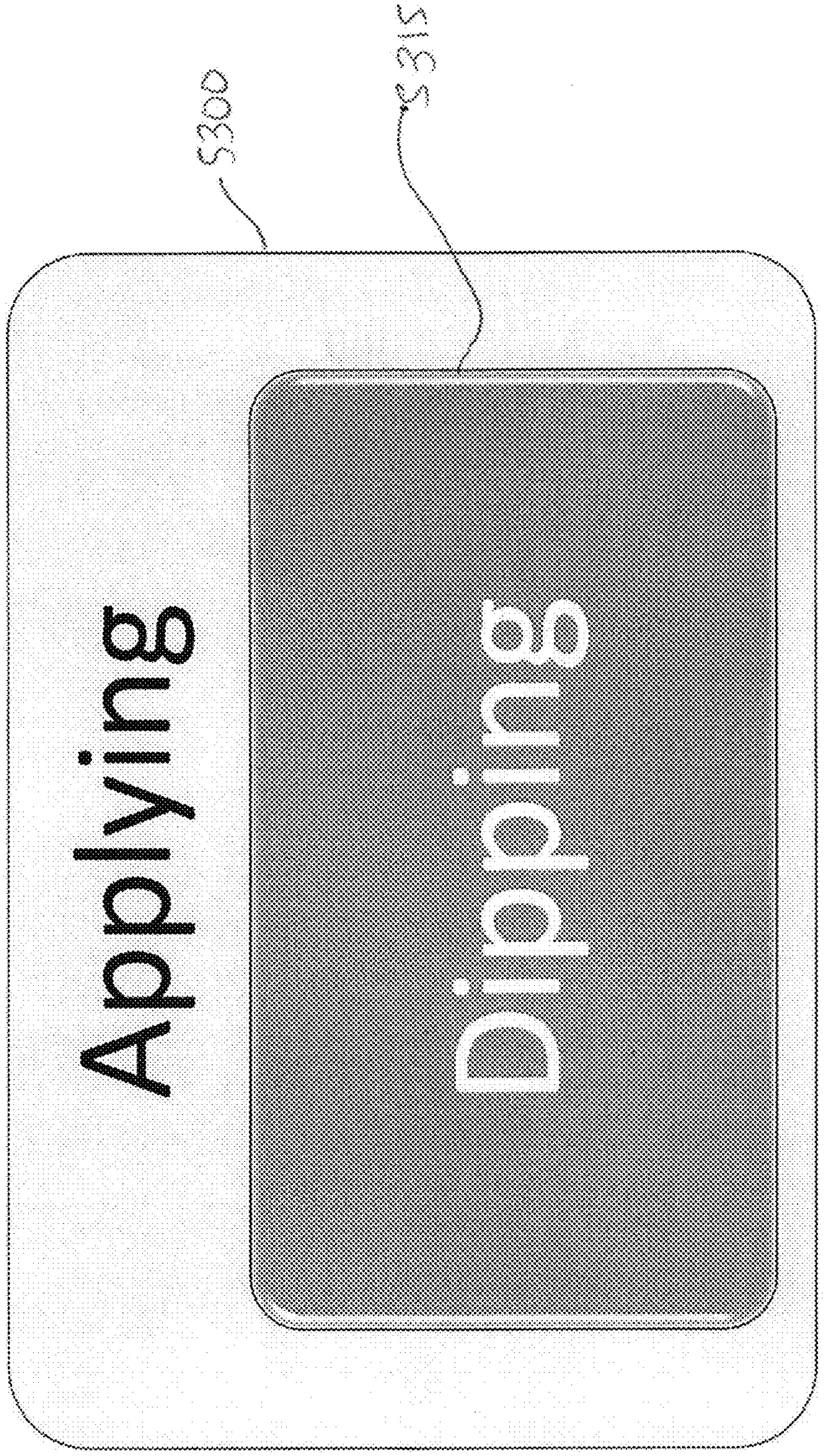
FIG. 11 is a diagram of a method of forming a vaporizer according to at least one example embodiment.

FIG. 11 is a diagram of a method of forming a vaporizer according to at least one example embodiment.

In at least one example embodiment, as shown in FIG. 11, the applying step S300 of FIGS. 9 and 10 includes dipping S315 the heating element 85 in the slurry to form the coating of the porous material 90 on the heating element 85. The dipping S315 step may include fully or partially submerging the heating element 85 in the slurry for about 1 second to about 10 minutes (e.g., about 30 seconds to about 5 minutes or about 1 minute to about 2 minutes). In at least one example embodiment, only a selected portion of the heating element 85 is dipped in the slurry. In other example embodiments, the entire heating element 85 is dipped in the slurry.

In at least one example embodiment, the heating element 85 may be dipped multiple times in one or more different slurries to form one or more different coatings on the heating element 85. The different slurries may include the same or different porous materials, such that the different layers of the coatings may have the same or different densities and/or porosities.

Figure 12:
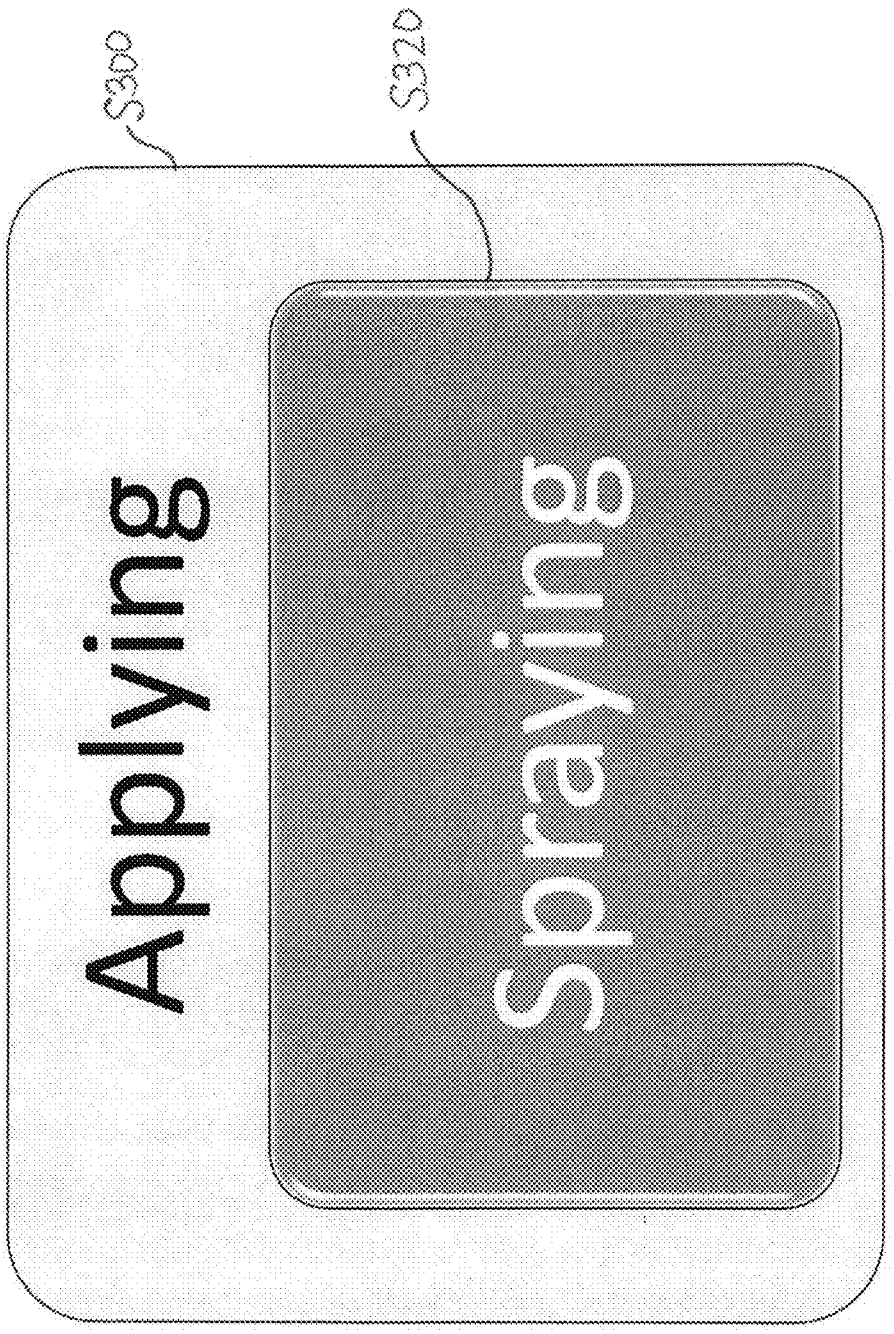
FIG. 12 is a diagram of a method of forming a vaporizer according to at least one example embodiment.

FIG. 12 is a diagram of a method of forming a vaporizer according to at least one example embodiment.

In at least one example embodiment, as shown in FIG. 12, the applying step S300 of FIGS. 9 and 10 includes spraying S320 the porous material 90 or slurry including the porous material 90 onto the heating element 85 to form the coating. The heating element 85 may be sprayed so that the coating is substantially uniform along the surface of the heating element 85 or so that the coating varies in thickness along the surface of the heating element 85. For example, the heating element 85 may be sprayed such that the coating is thicker in a central portion of the heating element 85 than at side portions of the heating element 85 or vice versa. The coating may be patterned on the heating element 85 so that selected portions of the heating element 85 are coated with the porous material 90.

In at least one example embodiment, the heating element 85 may be sprayed multiple times in one or more different slurries to form one or more different coatings on the heating element 85. The different slurries may include the same or different porous materials, such that the different layers of the coatings may have the same or different densities and/or porosities.

Figure 13:
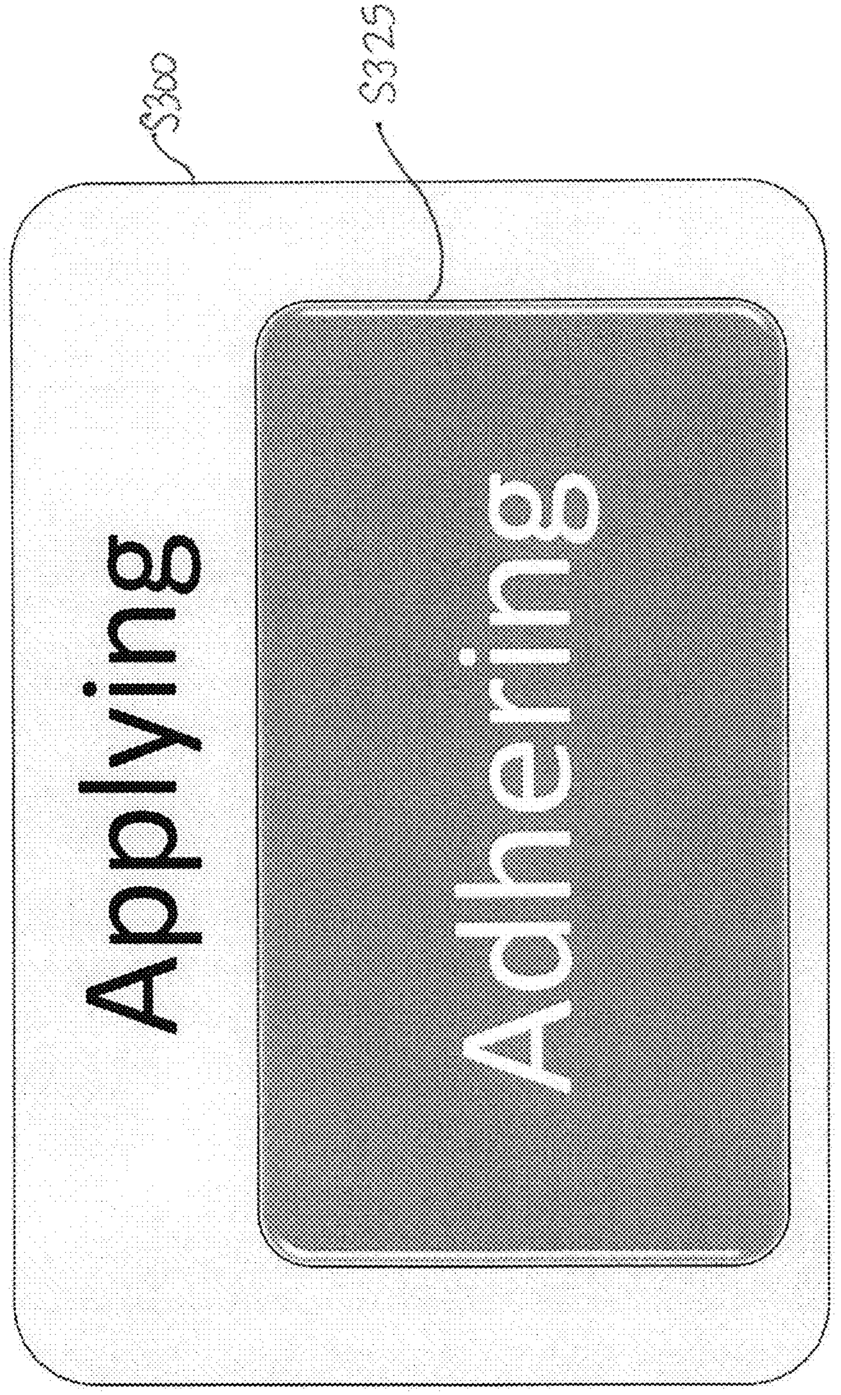
FIG. 13 is a diagram of a method of forming a vaporizer according to at least one example embodiment.

FIG. 13 is a diagram of a method of forming a vaporizer according to at least one example embodiment.

In at least one example embodiment, the applying step S300 may include adhering S325 the porous material 90 to the heating element 85 to form the vaporizer 80. The adhering S325 may include gluing or otherwise adhering the porous material 90 to the heating element 85. For example, beads and fibers of a desired material may be glued to at least one surface of the heating element 85.

In at least one example embodiment, the adhesive is a food grade adhesive that is generally recognized as safe (GRAS). The adhesive is also substantially heat resistant and/or substantially water and/or liquid resistant, such that the structural integrity of the coating is not affected by application or heat or liquids.

Example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

I claim:

1. A cartridge of an electronic vaping device comprising:
a housing extending in a longitudinal direction;
a reservoir in the housing, the reservoir including,
a storage medium configured to store a pre-vapor formulation, the storage medium including a fibrous material, the fibrous material including a plurality of fibers, the plurality of fibers including fibers having diameters ranging from 6 μm to 15 μm;
a vaporizer in the housing, the vaporizer including,
a heating element formed of a conductive material, and
a coating of a porous material directly adhered to two or more surfaces of the heating element using an adhesive, the porous material including cellulose, the porous material having a porosity of at least 90%, the two or more surfaces including a first surface and a second surface, the coating having a first thickness on the first surface and a second thickness on the second surface, the second thickness being different from the first thickness, the vaporizer being U-shaped, the U-shaped having a central portion and side portions; and
an absorbent material disposed between the reservoir and vaporizer and having the same material composition as the coating of the porous material, the absorbent material configured to convey the pre-vapor formulation from the storage medium to the coating of the vaporizer, the absorbent material directly contacting the central portion of the vaporizer, and the side portions of the vaporizer extending away from the absorbent material.

2. The cartridge of claim 1, wherein the porous material is flexible when dry.

3. The cartridge of claim 1, wherein the porous material is a hydrophilic material and further includes a ceramic.

4. The cartridge of claim 1, wherein the plurality of fibers include cotton, polyethylene, polyester, rayon, or any combination thereof.

5. An electronic vaping device comprising:
a housing extending in a longitudinal direction;
a reservoir in the housing, the reservoir including,
a storage medium configured to store a pre-vapor formulation, the storage medium including a fibrous material, the fibrous material including a plurality of fibers, the plurality of fibers including fibers having diameters ranging from 6 μm to 15 μm;
a vaporizer in the housing, the vaporizer including,
a heating element formed of a conductive material, and
a coating of a porous material adhered to two or more surfaces of the heating element using an adhesive, the porous material including cellulose, the porous material having a porosity of at least 90%, the two or more surfaces including a first surface and a second surface, the coating having a first thickness on the first surface and a second thickness on the second surface, the second thickness being different from the first thickness, the vaporizer being U-shaped, the U-shape having a central portion and side portions;
an absorbent material disposed between the reservoir and the vaporizer and having the same material composition as the coating of the porous material, the absorbent material configured to convey the pre-vapor formulation from the storage medium to the coating of the vaporizer, the absorbent material directly contacting the central portion of the vaporizer, and the side portions of the vaporizer extending away from the absorbent material; and
a power supply in the housing, the power supply electrically connectable to the heating element.

* * * * *